United States Patent [19]

Kaizu

[11] Patent Number: 4,991,430
[45] Date of Patent: Feb. 12, 1991

[54] SUPPORTING STRUCTURE FOR ROAD SIMULATED ENDLESS BELT ARRANGEMENT FOR BENCH TESTING APPARATUS

[75] Inventor: Hideo Kaizu, Gunma, Japan

[73] Assignee: Kabushiki Kaisha Meidensha, Tokyo, Japan

[21] Appl. No.: 486,069

[22] Filed: Feb. 28, 1990

[30] Foreign Application Priority Data

Mar. 2, 1989 [JP] Japan .................................. 1-24075
Mar. 2, 1989 [JP] Japan .................................. 1-24076

[51] Int. Cl.$^5$ .......................................... G01M 19/00
[52] U.S. Cl. .................................................. 73/117
[58] Field of Search ........................ 73/117, 123, 126

[56] References Cited

U.S. PATENT DOCUMENTS

| | | | |
|---|---|---|---|
| 3,520,180 | 7/1970 | Polhemus et al. | 73/117 UX |
| 4,324,128 | 0/1982 | Langer | 73/8 |
| 4,458,527 | 0/1984 | McFarland et al. | 73/146 |
| 4,622,848 | 0/1986 | Doi | 73/146 |
| 4,860,883 | 0/1989 | Knaul et al. | 198/495 |

Primary Examiner—Jerry W. Myracle
Attorney, Agent, or Firm—Bachman & LaPointe

[57] ABSTRACT

An endless belt type bench testing apparatus has a flexible metallic endless belt wound over a pair of rotary drums for rotation therewith. The apparatus has a hydraulic belt lubricating and support structure, in which a liquidus lubricating medium layer, such as a water layer, between the belt and a supporting structural member at an intermediate portion between the rotary drums. A seal structure for preventing the liquidus lubricating medium from leaking from a drain circuit, is provided at least at the downstream end of the clearance with respect to a direction of the belt motion. The seal structure includes a porous seal member associated with a resilient member to be resiliently biased toward an endless belt for establishing liquid-tight seal. The porous seal member is designed for absorbing part of drained liquidus lubricating medium. The porous seal member is also associated with a liquid removing means for removing the liquidus lubricating medium therefrom for maintaining sufficient liquid absorbing capacity of the seal member.

12 Claims, 2 Drawing Sheets

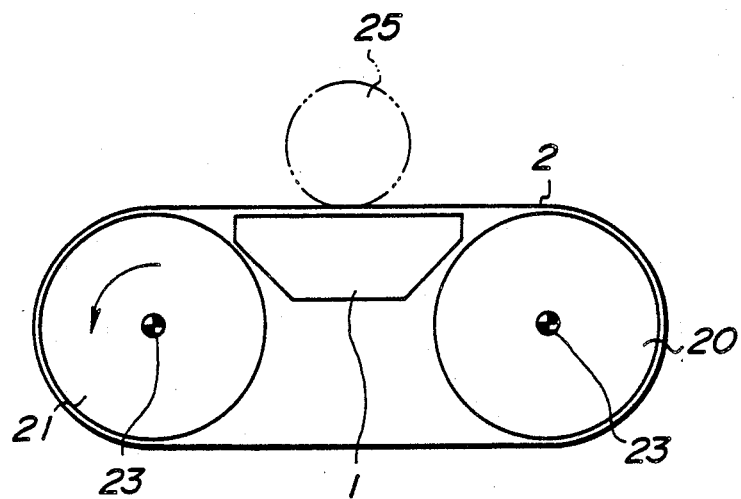
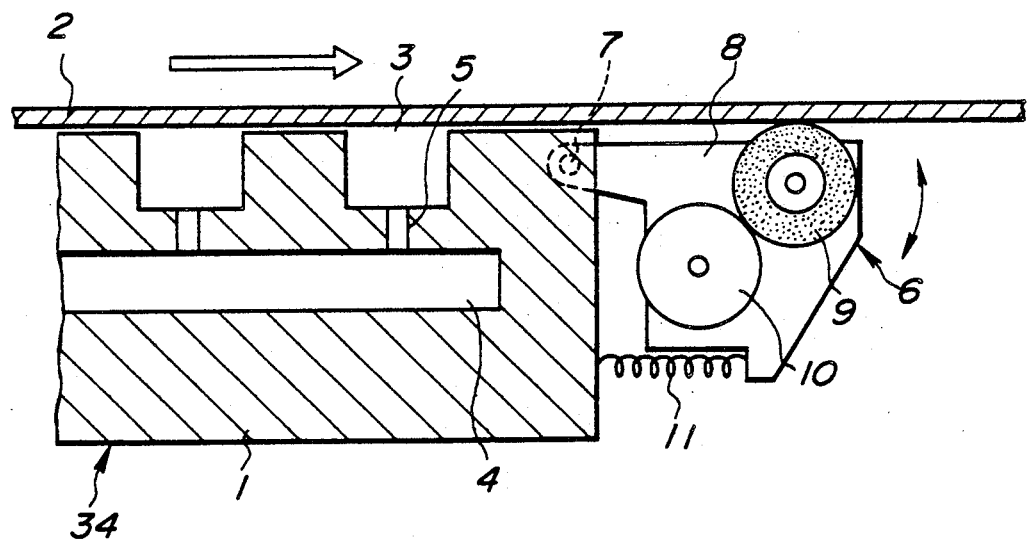

SUPPORTING STRUCTURE FOR ROAD SIMULATED ENDLESS BELT ARRANGEMENT FOR BENCH TESTING APPARATUS

BACKGROUND OF THE INVENTION

1. Field of the Invention

The present invention relates generally to an actual road simulated endless belt arrangement for a bench testing apparatus. More specifically, the invention relates to a hydrodynamic supporting structure for the belt arrangement with improved drain structure.

2. Description of the Background Art

Endless belt type bench testing apparatus for testing vehicular tires, vehicular performance have been developed. Utilizing such endless type bench testing apparatus, a simulated road test equivalent to the test to be performed on an actual road can be performed. For example, in case of tire test, deformation of tire or tire tread and/or slip angle at variety of tire load, camber angle and so forth. On the other hand, in case of the vehicular bench test on a chassis dynamometer, fuel economy test, engine performance test, endurance test and so forth can be performed by mounting all of the road wheels of the vehicle on the endless belt. Such bench testing apparatus employs a hydrodynamic supporting structure for an endless belt for providing support and bearing at a portion where load is applied. The hydrodynamic support has been proposed in the U.S. Pat. No. 4,324,128, issued on Apr. 13, 1982. The bench testing apparatus includes a pair of rotary drums and the endless belt formed of a flexible metallic belt. An intermediate portion between the rotary drums serves for supporting tire treads for testing performance of the tire per se and/or the vehicle, which intermediate portion will be hereafter referred to as "road simulated portion". A hydrodynamic support structure is provided for the road simulated portion for supporting the flexible metallic belt against load, i.e. load on the tire. In order to establish the hydrodynamic support and bearing for the flexible metallic belt, fluid medium, such as water, lubricant or so forth, is supplied beneath the flexible metallic belt for forming a thin and high pressure fluid layer.

Japanese Patent First (unexamined) Publication (Tokkai) Showa 56-129836 discloses the endless belt type bench testing apparatus which utilizes a dynamic pressure of the supporting fluid medium. In the disclosed structure, a supporting base is provided beneath the flexible metallic belt in a spaced apart relationship with maintaining a clearance therebetween. Water as the supporting fluid medium is supplied into the clearance between the support base and the flexible metallic belt for hydrodynamically establishing a pressurized fluid layer for supporting the load to be exerted on the road simulated portion. In such construction, the hydrodynamically generated pressure in the fluid layer serves for supporting the flexible metallic belt. On the other hand, Japanese Patent First Publication (Tokkai) Showa 55-128140 discloses another type of the endless belt type bench testing apparatus which utilizes a hydrostatic pressure of the supporting fluid medium.

In either of the aforementioned apparatus, the endless belt is driven at substantially high speed. As a result of high speed motion of the belt, the water forming the hydraulic bearing layer between the belt and support tends to be fed toward the downstream end in the motion direction of the endless belt. Therefore, large amount of water is discharged in the drainage groove at the portion corresponding to the downstream end of the belt path. As can be appreciated, since the large amount of water is drained at the downstream end of the belt path, water absorption capacity of the felt seal can be easily saturated within a short period to cause oozing of water out of the water drain circuit to encounter the aforementioned rusting problem for the components of the apparatus.

Furthermore, in the prior proposed technologies as set forth above, a seal member is provided in the vicinity of the drain path for assuring collection of the water discharged from the clearance between the belt and the support and for assuring avoidance of overflowing of the water from the drainage circuit. In the prior proposed apparatus, the seal member comprises a felt or the like provided in liquid-tight contact with the belt surface. For assuring liquid-tight seal, the felt seal is biased toward the belt surface for establishing resilient and tight contact thereto. This clearly results in increasing of magnitude of wearing of the seal member for causing degradation of the sealing ability in relatively short period. Since once water leakage is caused over the felt seal, rusting of metallic components may be caused. Therefore, in order to prevent the water from leaking, short interval maintenance has been required for causing increasing of the cost for operation.

SUMMARY OF THE INVENTION

Therefore, it is an object of the present invention to provide an endless belt type bench testing apparatus which can prevent a porous seal member from being saturated in absorption of liquidus lubricating medium.

Another object of the present invention to provide an endless belt type bench testing apparatus which has an improved seal structure for successfully preventing a liquidus lubricating medium from leaking and significantly reducing magnitude of wearing of a seal member.

In order to accomplish aforementioned and other objects, an endless belt type bench testing apparatus, according to the present invention, includes a porous seal member associated with a resilient member to be resiliently biased toward an endless belt for establishing liquid-tight seal. The porous seal member is designed for absorbing part of drained liquidus lubricating medium. The porous seal member is also associated with a liquid removing means for removing the liquidus lubricating medium therefrom for maintaining sufficient liquid absorbing capacity of the seal member.

According to one aspect of the invention, an endless belt type bench testing apparatus, comprises:

a pair of rotary drums;

a flexible metallic endless belt wound over the pair of rotary drums;

a supporting base disposed in a clearance defined between the rotary drums and in opposition to a portion of the endless belt with a predetermined clearance between the mating surfaces;

a liquidus lubricating medium supply system associated with the supporting base for supplying a liquidus lubricating medium into the clearance between the supporting base and the belt for forming a lubricating layer; and a drainage system provided at least at the downstream end of the supporting base for collecting the liquidus lubricating medium discharged from the clearance;

a seal structure including a seal member resiliently contacting with the endless belt, the seal member having capability of absorbing liquidus lubricating medium; and means for squeezing the liquidus lubricating medium absorbed within the porous structure of the seal member.

Preferably, the seal member comprises a sealing roller resiliently biased onto the belt and rotatable according to movement of the belt, the roller having a porous structure for absorbing the liquidus lubricating medium. In this case, the liquidus lubricating medium squeezing means may comprise an elastic roller provided in contact with the sealing roller for causing elastic deformation of the sealing roller for squeezing the liquidus lubricating medium.

The liquidus lubricating medium squeezing means may comprise a drafting means for drafting liquidus lubricating medium caught in the sealing member. In this case, the liquidus lubricant medium squeezing means may comprise a drawing tube inserted within the sealing member and a vacuum source for introducing vacuum pressure into the tube for drawing the liquidus lubricating medium caught in the sealing member. Further preferably, the seal structure may comprise a first sealing member extending overall circumference of the supporting base and a second sealing member extending along the downstream end of the supporting base.

According to another embodiment of the invention, an endless belt type bench testing apparatus, comprises:

a pair of rotary drums;

a flexible metallic endless belt wound over the pair of rotary drums;

a supporting base disposed in a clearance defined between the rotary drums and in opposition to a portion of the endless belt with a predetermined clearance between the mating surfaces;

a liquidus lubricating medium supply system associated with the supporting base for supplying a liquidus lubricating medium into the clearance between the supporting base and the belt for forming a lubricating layer; and a drainage system provided at least at the downstream end of the supporting base for collecting the liquidus lubricating medium discharged from the clearance;

a seal structure including a seal member resiliently contacting with the endless belt, the seal member having a porous structure for absorbing liquidus lubricating medium; and means for squeezing the liquidus lubricating medium absorbed within the porous structure of the seal member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1 is an illustration of an endless belt type bench testing apparatus for which the preferred embodiments of seal structures according to the present invention, is applicable;

FIG. 2 is an enlarged section of a major part of the first embodiment of a seal structure according to the present invention;

DESCRIPTION OF THE PREFERRED EMBODIMENT

Figure 3:
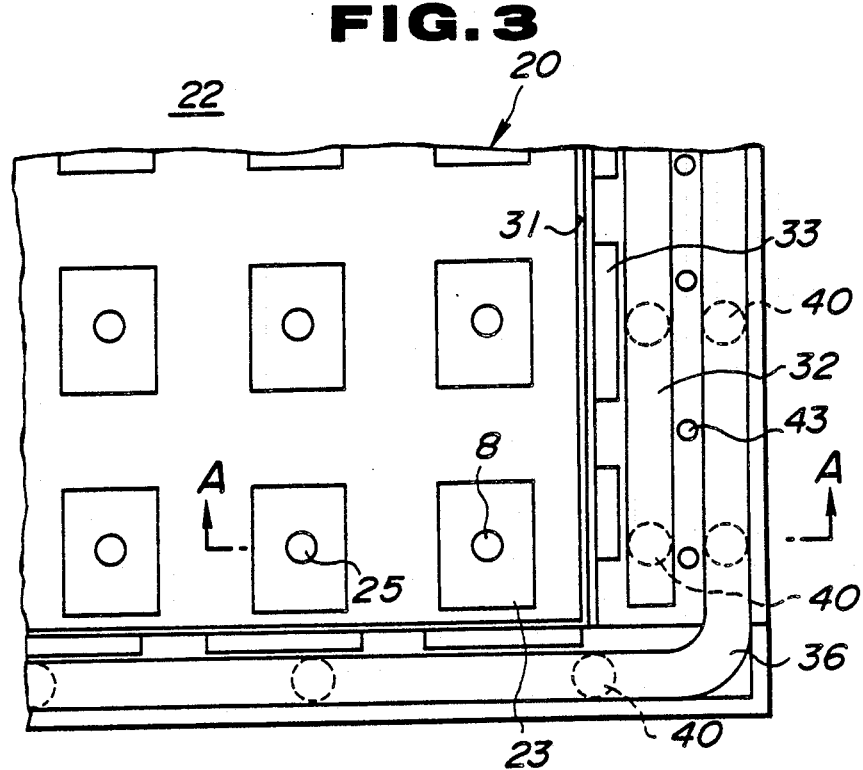
FIG. 3 is an enlarged plan view of a major part of the second embodiment of a seal structure according to the present invention.

Referring now to the drawings, particularly to FIG. 1, an endless belt type bench testing apparatus has a pair of rotary drums 20 and 21 which are rotatable about drum shafts 23. The rotary drums 20 and 21 are mutually placed in spaced apart relationship to each other to define a predetermined length of clearance therebetween. At least one of the rotary drums 20 and 21 is connected to a load serving as resistance for rotation and also to a dynamometer for measuring a force or torque exerted on the associated drum through a flexible metallic belt 2 which is wrapped or wound over the rotary drums. A supporting base 1 is provided within the clearance between the rotary drums 20 and 21 and oriented in the vicinity of the belt 2 with maintaining a substantially small clearance 12. The supporting base 1 and the associated portion of the endless belt 2 forms a road simulated portion, on which a tire 25 to be tested or road wheel or wheels of a vehicle to be tested are mounted.

A liquidus lubricating layer is formed within the clearance 12 for lubricating the belt 2 with respect to the supporting base 1 for smooth movement of the belt. Though any of appropriate liquidus lubricating medium, such as water, lubricant oil and so forth can be used for forming the liquidus lubricating layer, the shown embodiment uses water as the lubricating medium. In order to form the lubricating layer within the clearance 12, a water supply system is provided in the apparatus. As can be seen from FIG. 2, the water supply system includes a water supply path 4 defined within the supporting base 1. The water supply path 4 is connected to a water supply source (not shown) to be supplied a pressurized water. The water supply path 4 is communicated with a plurality of water discharge ports 5 which are, in turn, communicated with one of a plurality of transversely extended grooves 3. The grooves 3 open to the clearance 12 defined between the belt 2 and the upper surface of the supporting base 1.

With the shown construction, the water is supplied through the water supply path 4, the water discharge ports 5 and the groove 3 to form the water layer within the clearance between the belt 2 and the supporting base 1.

A seal structure as shown in FIG. 2 is provided at least in the vicinity of the downstream end of the clearance 12 for preventing water discharged from the clearance from leaking out of a drainage circuit. The seal structure comprises a support plate 8 pivotally supported on the downstream end of the supporting base 1 and biased by a spring 11 in counterclockwise direction in FIG. 2, for pivotal movement about a pivot 7. A porous and elastic roller 9 which is made of a material suitable for absorbing water carried with the belt 2, such as felt, sponge and so forth, is rotatably supported on the support plate 8. As can be seen from FIG. 2, the porous roller 9 is mounted on the support plate 8 at the orientation in the vicinity of the upper edge of the support plate so that the upper portion thereof is upwardly extended from the upper edge of the support plate. Therefore, the porous roller 9 is resiliently contact with the lower surface of the belt 2 as shown in FIG. 2. An elastic roller 10, such as a rubber roller, is also rotatably mounted on the support plate 8 with maintaining elastic contact with the porous roller 9. The elastic contact established between the porous roller 9 and the elastic roller 10 is such a magnitude as to cause certain magnitude of deformation for squeezing water absorbed in the porous structure of the porous roller 9.

With the shown construction, since the porous roller 9 is supported for rotation according to movement of the belt 2, friction between the belt and the roller can be substantially reduced for reducing magnitude of wearing. On the other hand, since the water absorbed in the porous structure of the porous roller 9 can be continuously squeezed by depressing the porous roller by means of the elastic roller, the porous structure may maintain sufficient water absorbing capacity for successfully absorbing the water without causing fear of oozing of water out of the drainage circuit.

Figure 4:
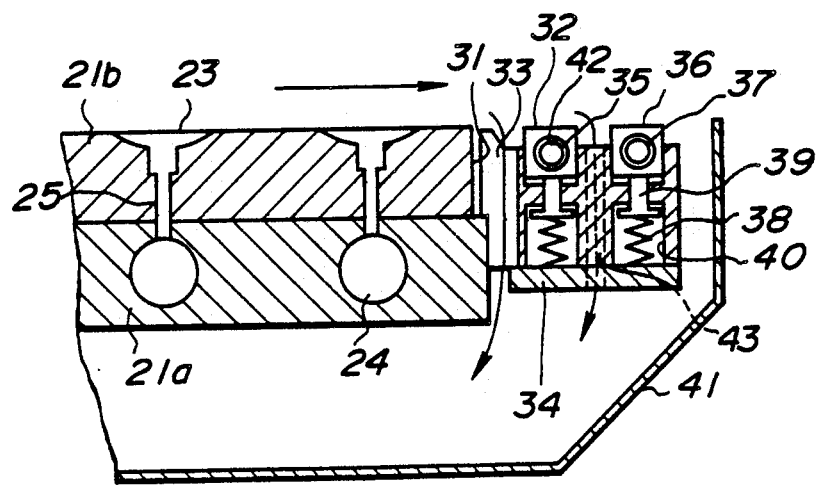
FIG. 4 is a section taken along line A—A of FIG. 3.

FIGS. 3 and 4 shows another embodiment of the seal structure according to the present invention. In the shown embodiment, a supporting base 21 comprises a lower base 21a and an upper base 21b. A water supply path 24 connected to a pressurized water source is defined in the lower base 21b. On the other hand, the upper base 21b is formed with a plurality of grooves 23 of essentially rectangular configuration in plan view. The grooves 23 are arranged in longitudinal and lateral alignment in a form of matrix. The grooves 23 are communicated with the water supply path 24 via a discharge port 25.

Along the downstream end edge of the supporting base 21, one or more water drain path 33 are formed for draining the water discharged from a clearance between the belt and the supporting base so that the drained water can be collected within a cover 41. A pair of inner and outer felt seals 32 and 36 are provided for sealingly contact with the lower end of the belt by means of bias springs 38. As can be seen, the inner felt seal 32 extends transversely along the downstream edge of the supporting base 21. On the other hand, the outer felt seat 36 extends along the circumference of the supporting base. Both of the inner and outer felt seals 32 and 36 are housed within a seal casing 34. The seal casing defines spring chambers 40 to receive therein the bias springs 38.

As seen from FIG. 4, the inner and outer felt seals 32 and 36 are provided hollow center opening 42. A flexible porous tube 37 is disposed within the center opening 42. The porous tubes 37 are connected to a vacuum pressure source so as to introduce vacuum pressure therethrough. As can be seen from FIG. 4, the inner and outer felt seals 32 and 36 are oriented in spaced apart relationship to each other. A plurality of drain holes 43 are formed through the seal casing 34 in transverse alignment.

With the shown construction, the water absorbed in the porous structure of the inner and outer felt seals 32 and 36 is drawn into the tubes 37 and is drained therethrough.

Therefore, the inner and outer felt seals 32 and 36 are never saturated in the water absorbing capacity and avoid fear of oozing of the drained water out of the drainage circuit.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An endless belt type bench testing apparatus, comprising:
   a pair of rotary drums;
   a flexible metallic endless belt wound over the pair of rotary drums;
   a supporting base disposed in a clearance defined between the rotary drums and in opposition to a portion of said endless belt with a predetermined clearance between the mating surfaces;
   a liquidus lubricating medium supply system associated with said supporting base for supplying a liquidus lubricating medium into said clearance between said supporting base and said belt for forming a lubricating layer; and
   a drainage system provided at least at the downstream end of said supporting base for collecting the liquidus lubricating medium discharged from said clearance;
   a seal structure including a seal member resiliently contacting with said endless belt, said seal member having capability of absorbing liquidus lubricating medium; and
   means for squeezing the liquidus lubricating medium absorbed within the porous structure of said seal member.

2. An endless belt type bench testing apparatus as set forth in claim 1, wherein said seal member comprises a sealing roller resiliently biased onto said belt and rotatable according to movement of said belt, said roller having a porous structure for absorbing the liquidus lubricating medium.

3. An endless belt type bench testing apparatus as set forth in claim 2, wherein said liquidus lubricating medium squeezing means comprises an elastic roller provided in contact with said sealing roller for causing elastic deformation of said sealing roller for squeezing the liquidus lubricating medium.

4. An endless belt type bench testing apparatus as set forth in claim 1, wherein said liquidus lubricating medium squeezing means comprises a drafting means for drafting liquidus lubricating medium caught in said sealing member.

5. An endless belt type bench testing apparatus as set forth in claim 4, wherein said liquidus lubricant medium squeezing means comprises a drawing tube inserted within said sealing member and a vacuum source for introducing vacuum pressure into said tube for drawing the liquidus lubricating medium caught in said sealing member.

6. An endless belt type bench testing apparatus as set forth in claim 5, wherein said seal structure comprises a first sealing member extending overall circumference of said supporting base and a second sealing member extending along the downstream end of said supporting base.

7. An endless belt type bench testing apparatus, comprising:
   a pair of rotary drums;

a flexible metallic endless belt wound over the pair of rotary drums;

a supporting base disposed in a clearance defined between the rotary drums and in opposition to a portion of said endless belt with a predetermined clearance between the mating surfaces;

a liquidus lubricating medium supply system associated with said supporting base for supplying a liquidus lubricating medium into said clearance between said supporting base and said belt for forming a lubricating layer; and a drainage system provided at least at the downstream end of said supporting base for collecting the liquidus lubricating medium discharged from said clearance;

a seal structure including a seal member resiliently contacting with said endless belt, said seal member having a porous structure for absorbing liquidus lubricating medium; and means for squeezing the liquidus lubricating medium absorbed within the porous structure of said seal member.

8. An endless belt type bench testing apparatus as set forth in claim 7, wherein said seal member comprises a porous roller resiliently biased onto said belt and rotatable according to movement of said belt, said roller having a porous structure for absorbing the liquidus lubricating medium.

9. An endless belt type bench testing apparatus as set forth in claim 8, wherein said liquidus lubricating medium squeezing means comprises an elastic roller provided in contact with said porous roller for causing elastic deformation of said porous roller for squeezing the liquidus lubricating medium.

10. An endless belt type bench testing apparatus as set forth in claim 7, wherein said liquidus lubricating medium squeezing means comprises a drafting means for drafting liquidus lubricating medium caught in the porous structure of said sealing member.

11. An endless belt type bench testing apparatus as set forth in claim 10, wherein said liquidus lubricant medium squeezing means comprises a porous tube inserted within the porous structure of said sealing member and a vacuum source for introducing vacuum pressure into said tube for drawing the liquidus lubricating medium caught in the porous structure of said sealing member.

12. An endless belt type bench testing apparatus as set forth in claim 11, wherein said seal structure comprises a first sealing member extending overall circumference of said supporting base and a second sealing member extending along the downstream end of said supporting base.

* * * * *